(12) United States Patent
Klumpp et al.

(10) Patent No.: US 8,132,963 B2
(45) Date of Patent: Mar. 13, 2012

(54) TEMPERATURE COMPENSATION ELEMENT FOR A CONNECTION UNIT

(75) Inventors: Wolfgang Klumpp, Achern (DE); Willi Maier, Oppenau (DE); Wigand Schneiderheinze, Leimersheim (DE)

(73) Assignee: Siemens Aktiengesellschaft, Munich (DE)

( * ) Notice: Subject to any disclaimer, the term of this patent is extended or adjusted under 35 U.S.C. 154(b) by 1619 days.

(21) Appl. No.: 10/550,781

(22) PCT Filed: Oct. 2, 2003

(86) PCT No.: PCT/DE03/03288
§ 371 (c)(1),
(2), (4) Date: Aug. 7, 2006

(87) PCT Pub. No.: WO2004/088797
PCT Pub. Date: Oct. 14, 2004

(65) Prior Publication Data
US 2010/0323553 A1 Dec. 23, 2010

(30) Foreign Application Priority Data
Mar. 28, 2003 (DE) .............. 103 14 406 U

(51) Int. Cl.
*G01K 7/00* (2006.01)
*H02B 1/20* (2006.01)

(52) U.S. Cl. .......................... 374/182; 374/181; 361/613

(58) Field of Classification Search .................. 374/182, 374/181; 361/613
See application file for complete search history.

(56) References Cited

U.S. PATENT DOCUMENTS

| 4,359,747 A * | 11/1982 | Goldschmidt et al. .... 346/33 TP |
| 5,340,216 A | 8/1994 | Goldschmidt |
| 5,590,058 A | 12/1996 | Foreman et al. |
| 5,741,073 A * | 4/1998 | Ribeiro et al. ................ 374/182 |

FOREIGN PATENT DOCUMENTS

| DE | 195 14 767 C1 | 5/1996 |
| DE | 198 55 245 A1 | 6/1999 |
| DE | 19826212 C1 | 2/2000 |
| DE | 195 14 768 C2 | 2/2001 |
| EP | 0605201 A1 | 7/1994 |

OTHER PUBLICATIONS

SIEMENS Catalog ST 70, 2003 Edition, p. 4.

\* cited by examiner

*Primary Examiner* — Jared Fureman
*Assistant Examiner* — Scott Bauer

(57) ABSTRACT

The aim of the invention is to reduce the temperature gradient at the connection terminals of a connection unit to which lines can be joined. The inventive temperature compensation element is made of at least one first strip of thermally conducting material on which terminal lugs are arranged in a row at essentially right angles to the strip and are insulted in relation to each other and the strip. The terminal lugs are connected to the strip in a thermally conductive manner and can be respectively contacted to the lines with corresponding contact terminals of the connection unit.

4 Claims, 1 Drawing Sheet

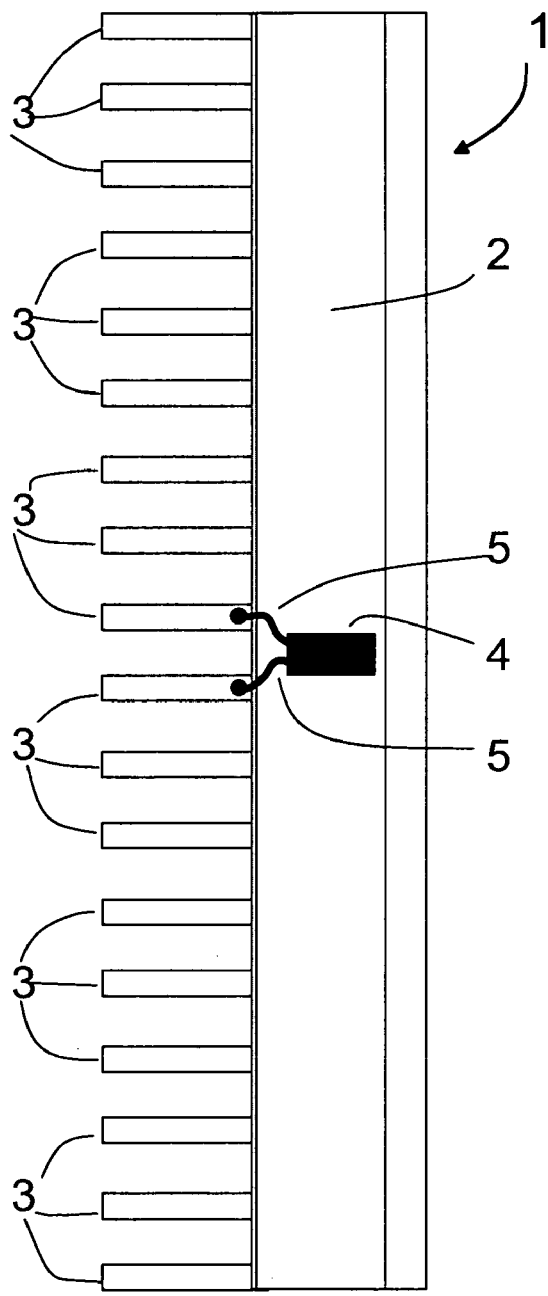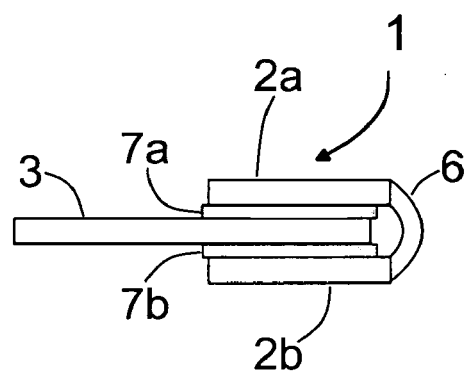
FIG 1  FIG 2

US 8,132,963 B2

TEMPERATURE COMPENSATION ELEMENT FOR A CONNECTION UNIT

CROSS REFERENCE TO RELATED APPLICATIONS

This application is the US National Stage of International Application No. PCT/DE2003/003288, filed Oct. 2, 2003 and claims the benefit thereof. The International Application claims the benefits of German application No. 10314406.4, filed Mar. 28, 2003, both applications are incorporated by reference herein in their entirety.

FIELD OF INVENTION

The invention relates to a temperature compensation element for a connection unit to which lines can be connected.

SUMMARY OF THE INVENTION

A connection unit in the form of a front-panel connector to which sensors or actors can be connected via lines is known from the Siemens catalog ST 70, page 4/114, 2003 edition. This front-panel connector can for example be plugged into a temperature measurement module to which thermal stress values from sensors can be fed via a number of input channels. To measure the temperature of a thermoelement as accurately as possible it is necessary to precisely record a comparison temperature at a measuring point in the vicinity of the connection terminal of the thermoelement. From this comparison temperature and the temperature of the thermoelement at the measuring point of the technical process to be controlled the absolute temperature at this measuring point is determined. As a result of the geometric expansion of the connection terminals on a multi-channel temperature measurement module the comparison temperature for each channel cannot be determined exactly since usually the module features only one measurement point for recording the comparison temperature for all connection terminals. This leads to imprecise temperature measurements, in particularly because the connection terminals are subjected to different thermal influences by components of the circuit board of the module.

The object of the present invention is to create a temperature compensation element for a connection unit of the type mentioned at the start of this document which minimizes a temperature gradient at the connection terminals of the connection unit.

This object is achieved by the claims.

In an embodiment of the invention the reduction of the temperature gradient at the connection terminals of the connection unit is increased.

In a further embodiment of the invention a temperature-dependent resistor is arranged on the strip. For the case in which the terminal lugs of the temperature compensation element are connected to the terminals of the connection unit, a suitable evaluation circuit of the connection unit can determine from the resistance value of the temperature-dependent resistor the exact comparison temperature for all terminals of the connection unit.

A further embodiment of the invention makes it possible to manufacture the temperature compensation element using simple methods. To manufacture two interconnected strips a right-angled copper plate which is appropriately folded is sufficient.

With reference to the drawing, in which an exemplary embodiment of the invention is illustrated, the invention, its embodiments and also its advantages are explained in more detail below.

BRIEF DESCRIPTION OF THE DRAWINGS

FIG. 1 shows a temperature compensation element viewed from above, and

FIG. 2 shows a side view of the temperature compensation element from FIG. 1.

DETAILED DESCRIPTION OF INVENTION

In FIG. 1 the number 1 indicates a temperature compensation element which includes a massive thermally-conductive strip 2, preferably a copper bar. Essentially at right angles to this strip are a series of electrically-conducting terminal lugs 3 pressed onto or glued onto the strip 2 in a row, with insulation material as thermally-conductive material being provided between the strip 2 and the terminal lugs 3 as well as between the individual terminal lugs 3. This means that the terminal lugs 3, which preferably also consist of copper, are electrically isolated from the strip 2 and from the other terminal lugs 3. The gap between the terminal lugs 3 arranged in a row is selected so that the terminal lugs 3 can be contacted in corresponding connection terminals of a front-panel connector of a process control module. This type of front-panel connector is for example known from DE 195 14 767 C1 or DE 19855245 195 14 768 C2. This front-panel connector can be plugged into a module and features connection terminals in the form of screw terminals to which process control lines connected to sensors can be attached.

To enable an exact comparison temperature for all connection terminals of the front-panel connector to be determined, the strip 2 is provided with a temperature-dependent resistor 4 of which the terminals 5 are connected to a terminal lug 3 in each case. For the case in which the terminal lugs 3 are screwed to the connection terminals of the front-panel connector and the front-panel connector is plugged into a module, a suitable evaluation circuit of the module can determine the comparison temperature from the resistance value of the temperature-dependent resistor.

The text below refers to FIG. 2 in which the temperature compensation element in accordance with FIG. 1 is shown in a side view. To further reduce the temperature gradient at the connection terminals of the front-panel connector, temperature compensation element 1 features two thermally-conductive strips 2a, 2b connected to each other via a thermally-conductive connection piece 6. The strips 2a, 2b are each electrically isolated via an isolation strip 7a, 7b made of thermally-conduction material from the terminal lugs 3, to avoid short circuits between the terminal lugs 3 and the metallic strip 2.

The invention claimed is:

1. A temperature compensation element for a connection unit to which lines can be connected, the temperature compensation element comprising:
    a first strip of thermally-conductive material;
    a second strip of thermally-conductive material; and
    a plurality of thermally-conductive terminal lugs extending straightaway between a first end and a second end, each lug comprising a first lug section extending from the first end to respective edges of the first and second strips, the first lug section sandwiched between corresponding inner surfaces of the first and second strips, each lug further comprising a second lug section extending from the respective edges to the second end, the second lug section extending essentially perpendicular beyond the edges of the first and second strips, wherein the thermally-conductive terminal lugs are arranged in spaced relationship from one another to form a row between the first and second strips, wherein each lug can be contacted with corresponding terminals of the connection unit, and wherein the lugs are thermally coupled to the first and second strips, wherein the first and second strips and the terminal lugs are electrically-conducting, wherein the terminal lugs are electrically isolated from the first strip, wherein on at least one of the first and second strips a temperature-dependent resistor is arranged, and wherein a pair of terminals of the resistor is electrically coupled to a pair of terminal lugs, the pair of terminal lugs comprising an adjacent pair of terminal lugs.

2. The temperature compensation element in accordance with claim 1, wherein the first strip and the second strip are connected to each other by way of a thermally-conductive piece connected to first ends of the strips.

3. A temperature compensation element for a connection unit, to which lines can be connected, with the temperature compensation element comprising:
   at a first strip of thermally-conductive material;
   a second strip of thermally-conductive material;
   a plurality of thermally-conductive terminal lugs extending straightaway between a first end and a second end, each lug comprising a first lug section extending from the first end to respective edges of the first and second strips, the first lug section sandwiched between corresponding inner surfaces of the first and second strips, each lug further comprising a second lug section extending from the respective edges to the second end, the second lug section extending essentially perpendicular beyond the edges of the first and second strips, wherein the thermally-conductive terminal lugs are arranged in spaced relationship from one another to form a row between the first and second strips, wherein each lug can be contacted with corresponding terminals of the connection unit, and wherein the lugs are thermally coupled to the first and second strips, wherein the first and second strips and the terminal lugs are electrically-conducting, wherein the terminal lugs are electrically isolated from the first and second strips by way of first and second isolation strips respectively attached to the inner surfaces of the first and second strips, wherein on at least one of the first and second strips of thermally-conductive material, a temperature-dependent resistor is arranged, and wherein a pair of terminals of the resistor is electrically coupled to a pair of terminal lugs, the pair of terminal lugs comprising an adjacent pair of terminal lugs.

4. The temperature compensation element in accordance with claim 3, wherein the first strip and second strip of thermally-conductive material are connected to each other by way of a thermally-conductive piece connected to first ends of the strips of thermally-conductive material.

* * * * *